United States Patent [19]
Ohmoto et al.

[11] Patent Number: 5,883,178
[45] Date of Patent: Mar. 16, 1999

[54] CRYSTALLINE POLYOLEFIN RESIN COMPOSITION AND ELECTRICAL INSULATING PART COMPRISING SAID COMPOSITION

[75] Inventors: Hiromi Ohmoto; Mitsuhiro Touhara, both of Chiba, Japan

[73] Assignee: Chisso Corporation, Osaka, Japan

[21] Appl. No.: 894,910

[22] PCT Filed: Feb. 16, 1995

[86] PCT No.: PCT/JP95/00218

§ 371 Date: Aug. 13, 1997

§ 102(e) Date: Aug. 13, 1997

[87] PCT Pub. No.: WO96/25460

PCT Pub. Date: Aug. 22, 1996

[51] Int. Cl.[6] .............................. C08K 5/02; C08K 3/38; C08K 3/40
[52] U.S. Cl. .......................... 524/469; 524/404; 524/411; 524/425; 524/449; 524/466; 524/492; 524/494
[58] Field of Search ..................................... 524/404, 411, 524/425, 449, 466, 469, 492, 494

[56] References Cited

U.S. PATENT DOCUMENTS 5,077,334  12/1991  Hussain ..................................... 524/469
5,281,648   1/1994  Docet et al. ............................. 524/467

*Primary Examiner*—Kriellion S. Morgan
*Attorney, Agent, or Firm*—Wenderoth, Lind & Ponack, L.L.P.

[57] ABSTRACT

The invention relates to crystalline polyolefin resin compositions obtained by blending 40 to 85% by weight of a crystalline propylene polymer, 3 to 40% by weight of an inorganic filler, 7 to 30% by weight of a halogen-containing flame retardant comprising ethylenebistetrabromophthalimide, decabromodiphenylethane, or their mixture, and 3 to 15% by weight of a flame retarding auxiliary; and electrical insulating parts obtained by molding the crystalline polyolefin resin composition.

By using the crystalline polyolefin resin compositions of the invention, blooming (separation, in a powder-like form, of an ingredient) on the surface of a mold at the time of injection molding can be prevented, deterioration in appearance of final products due to the transfer of the bleeded ingredient to the surface of the mold is obviated, and decrease in productivity caused by wiping the bleeded ingredient off the mold can be avoided. In addition to the bleeding property onto the mold, mechanical properties (tensile strength and bending elastic modulus), electrical property, bleeding property of final products, appearance of final products, and flame retardancy can be satisfied at the same time by using the composition. Therefore, the crystalline polyolefin resin compositions of the present invention can widely be used for electrical insulating parts including deflection yoke separators.

6 Claims, No Drawings

CRYSTALLINE POLYOLEFIN RESIN COMPOSITION AND ELECTRICAL INSULATING PART COMPRISING SAID COMPOSITION

TECHNICAL FIELD

The present invention relates to crystalline polyolefin resin compositions. More specifically, the present invention relates to crystalline polyolefin resin compositions obtained by blending an inorganic filler, halogen-containing flame retardant, and flame retarding auxiliary to a crystalline propylene polymer resin, and preferably used for electrical insulating parts such as a separator for deflection yokes.

BACKGROUND ART

Heretofore, deflection yoke separators are used for domestic televisions and a display of computers. As the material for the separators, (1) modified polyphenylene oxides (hereinafter referred to as modified PPO), (2) polybutylene terephthalate resins blended with a flame retardant and glass fibers (hereinafter referred to as PBT blended with flame retardant and glass fiber), and (3) polypropylene resins blended with a talc and flame retardant are used.

Modified PPO has a defect that the cost of final products is high based both on the cost of material and the productivity at molding, whereas it is widely used as the material for deflection yoke separators for domestic televisions and a display of computers.

PBT blended with a flame retardant and glass fibers has a defect that it is inferior in tracking resistance. If the tracking resistance is poor, when televisions are used in an environment of a high temperature and a high humidity, outside surface of the deflection yoke separators humidified and covered with dust is partially carbonized by a minute electric discharge to electrically continue thereby producing an inferior insulation. This deterioration in the tracking resistance is caused by the molecular structure of resins used as the material. For instance, since the bond between carbon atoms in benzene ring is strong, such resins as PBT having benzene ring within the molecule are hardly gasified by the heat energy of the minute electrical discharge, and free carbon atoms in the graphite structure remain on the surface to facilitate the electrical continuing thereby decreasing the tracking resistance. On the other hand, polypropylene resins are considerably excellent in the tracking resistance since they do not have benzene ring in the molecule. Accordingly, polypropylene resins are most suitable as the material for deflection yoke separators from the viewpoint of the tracking resistance.

Polypropylene resins blended with a talc and flame retardant are materials which improved the tracking resistance of the PBT blended with a flame retardant and glass fiber mentioned above. In the materials, a halogen-containing flame retardant, decabromodiphenyl ether, dodecachlorododeca-hydrodimethanodibenzodichlorooctene, or their mixture is used as flame retardant.

However, they have a problem that a mechanical property (tensile strength) decreases due to the use of the halogen-containing flame retardant. Further, when they are used at a high temperature, flame retardancy decreases and appearance of final products deteriorates since the flame retardant is bloomed (phenomenon of separation, in a powder-like form, on the surface of final products). Specifically, when deflection yoke separators are injection molded by using a polypropylene resin composition blended with a talc and a flame retardant, the halogen-containing flame retardant mentioned above is bloomed onto a mold (phenomenon of separation, in a powder-like form, on the surface of a mold), the bleeded ingredient adhered on the surface of the mold is transferred on the surface of molded articles, and thus the appearance of deflection yoke separators deteriorates. Besides, the productivity extremely decreases since the production is discontinued and a work for wiping off the bleeded flame retardant is conducted to obtain final products having a good appearance,.

Whereas ethylene-vinyl acetate copolymers (EVA), aliphatic carboxylic acids, or salts of aliphatic carboxylic acids are generally used as additive for suppressing the bleeding phenomenon mentioned above, there exists a problem that a mechanical property (rigidity) decreases and the cost of the material increases.

An object of the present invention is to solve the problems in the prior art mentioned above, and to provide crystalline polyolefin resin compositions which are balanced in cost, and every characteristics of moldability, mechanical properties (tensile strength and rigidity), impact resistance, electrical properties, and flame retardancy, and which avoid the production of inferior appearance of molded products such as deflection yoke separators due to the bleeding of the flame retardant onto the mold when propylene resins blended with a talc and flame retardant are molded, and avoid the decrease in the productivity; and to provide electrical insulating parts comprising the composition.

DISCLOSURE OF THE INVENTION

As a result of the investigations by the present inventors for preventing the bleeding of a flame retardant onto a mold at the time of injection molding, it has been found that the bleeding of a flame retardant onto the mold is remarkably improved by using ethylenebistetrabromophthalimide and/or decabromodiphenylethane as halogen-containing flame retardant, leading to the accomplishment of the present invention.

That is, the invention claimed by the present application is as follows:

(1) A crystalline polyolefin resin composition comprising 40 to 85% by weight of a crystalline propylene polymer, 3 to 40% by weight of an inorganic filler, 7 to 30% by weight of decabromophenylethane as flame retardant, and 3 to 15% by weight of a flame retarding auxiliary.

(2) The crystalline polyolefin resin composition recited in (1) above wherein the crystalline propylene polymer is a propylene homopolymer or a propylene-ethylene copolymer.

(3) The crystalline polyolefin resin composition recited in (2) above wherein the propylene homopolymer has a melt flow rate of 1.0 to 80 g/10 min.

(4) The crystalline polyolefin resin composition recited in (2) above wherein the propylene-ethylene copolymer has a content of ethylene of 2 to 35% by weight and a melt flow rate of 1.0 to 40 g/10 min.

(5) The crystalline polyolefin resin composition recited in any one of (1) to (4) above wherein the inorganic filler is a talc, mica, silica, calcium carbonate, barium sulfate, or glass fiber.

(6) The crystalline polyolefin resin composition recited in any one of (1) to (5) above wherein the flame retarding auxiliary is an antimony compound or boron compound.

(7) An electrical insulating part obtained by molding the crystalline polyolefin resin composition defined in any one of (1) to (6) above.

(8) A crystalline polyolefin resin composition comprising 40 to 85% by weight of a crystalline propylene polymer, 3 to 40% by weight of an inorganic filler, 7 to 30% by weight of a mixture of decabromophenylethane with ethylenebistetrabromophthalimide, as flame retardant, and 3 to 15% by weight of a flame retarding auxiliary.

As the crystalline propylene polymer used in the present invention, crystalline propylene homopolymers having a melt flow rate (MFR: amount of melted resin extruded for 10 min when 2.16 kg of a load is applied at 230° C.) of 1.0 to 80 g/10 min, and crystalline propylene-ethylene copolymers having an ethylene content of 2 to 35% by weight and a melt flow rate of 1.0 to 40 g/10 min are preferable. Particularly when propylene-ethylene copolymers are used, crystalline propylene-ethylene block copolymers are preferable. Amount of the crystalline propylene polymers to be blended is 40 to 85% by weight and preferably 50 to 60% by weight from the viewpoint of mechanical properties.

Copolymers such as modified polyolefin resins, polyethylenes, propylene-ethylene copolymers, and polybutenes may be used when necessary. The modified polyolefin resins are obtained by melting and kneading these polyolefin resins with an unsaturated carboxylic acid or its anhydride (for example, maleic anhydride) in the presence of an organic peroxide. For example, modified polyethylenes, modified propylene homopolymers, modified propylene-ethylene copolymers, and modified polybutenes are mentioned as the modified polyolefin resin, and particularly modified propylene-ethylene copolymers are preferable. Amount of these resins to be blended is preferably in the range of 3 to 8% by weight based on the amount of the crystalline propylene polymer.

Inorganic fillers used in the present invention are not particularly restricted in the aspect of particle size. While it is usually sufficient to use inorganic fillers which are commercially available as ones for thermoplastic resins, the fillers having a large aspect ratio are preferable. More specifically, talcs, micas, silicas, calcium carbonate, barium sulfate, and glass fibers are mentioned. While inorganic fillers may be used as they remain untreated, the fillers surface of which particles is covered with one of various kind of organic titanate type coupling agents, silane type coupling agents, fatty acids, metal salts of fatty acids, esters of fatty acids for the purpose of increasing adhering property to or dispersing property in a matrix resin may also be used. Amount of the inorganic fillers to be blended is 3 to 40% by weight and preferably 5 to 25% by weight. When the amount is less than 3% by weight, the effect on improvement in mechanical properties (tensile strength and rigidity) of molded products to be obtained is small, but when it exceeds 40% by weight, impact strength of molded products decreases.

Halogen-containing flame retardant used in the present invention is decabromodiphenylethane or its mixture with ethylenebistetrabromophthalimide. These halogen-containing flame retardant have a melting point higher than 200° C., and are excellent in bleeding characteristic of the product and mold at the time of molding. Particularly, decabromodiphenylethane is preferable from the viewpoint of impact resistance. Amount of the halogen-containing flame retardant to be blended is 7 to 30% by weight and preferably 10 to 25% by weight. When the amount of blending is less than 7% by weight, flame retardancy to be expected of molded articles can not be attained by using the resulting resin compositions. When the amount exceeds 30% by weight, mechanical property (tensile strength) and impact resistance of molded articles from the resin compositions and granulating ability at the time of pelletizing the resin compositions deteriorate.

As the flame retarding auxiliary used in the present invention, antimony compounds such as antimony trioxide and boron compounds such as zinc borate and borax are mentioned. Amount of the flame retarding auxiliary to be blended is 3 to 15% by weight from the viewpoint of flame retardancy, and preferably ¼ to ½ of the weight of the halogen-containing flame retardant to be used.

In addition to the components mentioned above, a coloring agent such as a dye and pigment, nucleator, lubricating agent, antioxidant, heat stabilizer, light stabilizer, release agent, cross-linking auxiliary, radical generator, and foaming agent can be added to the resin compositions of the present invention, when necessary.

While method for producing the resin compositions of the present invention is not particularly restricted, it can be performed, for instance, by introducing the crystalline propylene polymer resin mentioned above, and a specific amount of an inorganic filler, halogen-containing flame retardant, and flame retarding auxiliary in a stirring and mixing apparatus such as a Henschel mixer or super-mixer, stirring them for 30 sec to 3 min to mix, melting and kneading the resulting mixture by using a Banbury type mixer, roll, or extruder, and then pelletizing. As the melting and kneading temperature, 180° to 280° C. is preferable and 200° to 250° C. is more desirable.

BEST MODE FOR CARRYING OUT THE INVENTION

Now, the present invention is specifically described with reference to Examples and Comparative Examples. However, it should be understood that the present invention by no means restricted by such examples. Various kind of tests in Examples and Comparative Examples were carried out by the following methods:

1) Mechanical Property

Mechanical properties (tensile strength and rigidity) were evaluated by determining tensile strength (according to JIS K-7113) and bending elastic modulus (according to JIS K-7203).

2) Impact Resistance

Impact resistance was evaluated by determining Izod impact strength (according to JIS K-77110).

3) Electrical Property

Electrical property was evaluated by determining arc resistance (according to ASTM D-495).

4) Bleeding Property of Final Product

After a sample peace of 50×50×2 mm prepared by an injection molding was left in an oven at 100° C. for 240 hrs, its appearance was observed with the naked eye. Bleeded products were graded as poor and not-bleeded ones as good.

5) Bleeding Property onto Mold

After molding was conducted 100 shots by an injection molding by using a mold for a sample piece of 100×50×2 mm, the surface of the mold was observed with the naked eye. Bleeded cases were graded as poor and not-bleeded cases as good.

6) Appearance of Final Product

After a sample piece of 100×50×2 mm was molded 100 shots, the surface of a sample piece was observed with the naked eye. Sample pieces to which a bleeded ingredient was transferred from the mold were graded as poor and ones not transferred were graded as good.

7) Flame Retardancy

Flame retardancy was evaluated by conducting a flame test according to the vertical flame test defined in America UL Standard, Subject 94 (UL 94) by using a sample piece of 127×12.7×1.6 mm prepared by an injection molding.

EXAMPLES 1 THROUGH 12, AND COMPARATIVE EXAMPLES 1 THROUGH 24

As Examples 1 through 12 and Comparative Examples 1 through 12, a crystalline propylene homopolymer resin having a melt flow rate of 5 g/10 min (hereinafter, sometimes referred to as PP homopolymer) or a crystalline propylene-ethylene block copolymer resin having a melt flow rate of 5 g/10 min and having an ethylene content of 8.5% by weight (hereinafter, sometimes referred to as PP block copolymer), and a prescribed amount of each of a talc as inorganic filler, ethylenebistetrabromophthalimide (Trade name: Saytex BT93; produced by Albemarle Corp.) or decabromodiphenyl-ethane (Trade name: Saytex 8010; produced by Albemarle Corp.) as flame retardant, and antimony trioxide as flame retarding auxiliary, as described in Tables 1 and 2 shown below, were charged in a Henschel mixer (produced by Mitsui Miike KaKo Co., Ltd.), and stirred for 1 min to mix.

The mixture thus obtained was melted and kneaded at a melt-kneading temperature of 230° C., and extruded by using a twin extruder having a die orifice diameter of 30 mm, and pelletized.

Also, as Comparative Examples 13 through 24, a prescribed amount of each of the blending components were stirred to mix in a Henschel mixer and tumbler according to Examples 1 through 12 with the exception that decabromodiphenyl ether (Trade name: Saytex 102R; produced by Albemarle Corp.) was used as halogen-containing flame retardant, as described in Table 3 shown below, and melted, kneaded, and extruded by using a twin extruder having a die orifice diameter of 30 mm, and pelletized.

Next, sample pieces of a prescribed shape were molded by an injection molding by using pellets obtained in each of Examples and Comparative Examples at a resin temperature of 250° C. and a mold temperature of 50° C., and subjected to evaluation of mechanical properties (tensile strength and bending elastic modulus), electrical property (arc resistance), bleeding property of final product, bleeding property onto mold, appearance of final product, and flame retardancy. The results are shown together in Tables 1 to 3.

As will be clear from Tables 1 to 3, molded products obtained in Examples 1 through 12 in which a resin composition of the present invention was used were extremely well balanced between characteristics such as mechanical properties (tensile strength and bending elastic modulus), impact resistance, electrical property (arc resistance), bleeding property of final product, bleeding property onto mold, appearance of final product, and flame retardancy. Particularly, inferiority in the bleeding property onto mold and appearance of final product which are a defect of decabromodiphenyl ether, as flame retardant, was capable of being solved by using decabromo-diphenylethane.

That is, as will be clear from the comparison of Examples 1 to 6 with Comparative Examples 1 to 6 and Comparative Examples 13 to 18, in the case where a base polymer is a crystalline propylene homopolymer, when decabromodiphenyl ether was used as halogen-containing flame retardant, bleeding of final product occurred. However, that problem was found to solve by using ethylenebistetrabromophthalimide or decabromodiphenylethane.

Further, as will be clear from the comparison of Comparative Examples 1 through 12 wherein ethylenebistetrabromophthalimide was used with Examples 1 through 12 wherein decabromodiphenylethane was used, respectively, as halogen-containing flame retardant; in the aspect of flame retardant, the cases where decabromo-diphenylethane was used were superior in impact resistance.

TABLE 1

| Comparative Example | 1 | 2 | 3 | 4 | 5 | 6 |
|---|---|---|---|---|---|---|
| Blend (% by weight) | | | | | | |
| PP homopolymer | 80 | 75 | 70 | 63 | 53 | 65 |
| PP block copolymer | 0 | 0 | 0 | 0 | 0 | 0 |
| Talc | 5 | 10 | 15 | 15 | 15 | 20 |
| Ethylenebistetrabromophthalimide | 10 | 10 | 10 | 15 | 25 | 10 |
| Antimony trioxide | 5 | 5 | 5 | 7 | 7 | 5 |
| Tensile strength (kgf/cm$^2$) | 360 | 350 | 350 | 320 | 330 | 320 |
| Bending elastic modulus (kgf/cm$^2$) | 24,000 | 27,000 | 30,000 | 33,000 | 35,000 | 34,000 |
| Izod impact strength (kgf · cm/cm$^2$) | 4.2 | 4.0 | 3.7 | 3.5 | 3.0 | 3.3 |
| Arc resistance (sec) | 110 | 105 | 100 | 75 | 70 | 75 |
| Bleeding property of final product (100° C., 240 hr) | Good | Good | Good | Good | Good | Good |
| Bleeding property onto mold (after 100 shots of injection molding) | Good | Good | Good | Good | Good | Good |
| Appearance of final product (after 100 shots of injection molding) | Good | Good | Good | Good | Good | Good |
| Flammability (UL94 vertical method, 1.6 mm, class) | V-2 | V-2 | V-2 | V-1 | V-0 | V-2 |
| Comparative Example | 7 | 8 | 9 | 10 | 11 | 12 |
| Blend (% by weight) | | | | | | |
| PP homopolymer | 0 | 0 | 0 | 0 | 0 | 0 |
| PP block copolymer | 80 | 75 | 70 | 63 | 53 | 65 |
| Talc | 5 | 10 | 15 | 15 | 15 | 20 |
| Ethylenebistetrabromophthalimide | 10 | 10 | 10 | 15 | 25 | 10 |
| Antimony trioxide | 5 | 5 | 5 | 7 | 7 | 5 |
| Tensile strength (kgf/cm$^2$) | 280 | 270 | 260 | 250 | 240 | 250 |

TABLE 1-continued

| | | | | | | |
|---|---|---|---|---|---|---|
| Bending elastic modulus (kgf/cm$^2$) | 20,000 | 24,000 | 27,000 | 30,000 | 31,000 | 30,000 |
| Izod impact strength (kgf · cm/cm$^2$) | 4.9 | 4.5 | 4.1 | 4.0 | 3.5 | 4.0 |
| Arc resistance (sec) | 110 | 110 | 100 | 75 | 70 | 75 |
| Bleeding property of final product (100° C., 240 hr) | Good | Good | Good | Good | Good | Good |
| Bleeding property onto mold (after 100 shots of injection molding) | Good | Good | Good | Good | Good | Good |
| Appearance of final product (after 100 shots of injection molding) | Good | Good | Good | Good | Good | Good |
| Flammability (UL94 vertical method, 1.6 mm, class) | V-2 | V-2 | V-2 | V-1 | V-0 | V-2 |

TABLE 2

| Example | 1 | 2 | 3 | 4 | 5 | 6 |
|---|---|---|---|---|---|---|
| Blend (% by weight) | | | | | | |
| PP homopolymer | 80 | 75 | 70 | 63 | 53 | 65 |
| PP block copolymer | 0 | 0 | 0 | 0 | 0 | 0 |
| Talc | 5 | 10 | 15 | 15 | 15 | 20 |
| Decabromodiphenylethane | 10 | 10 | 10 | 15 | 25 | 10 |
| Antimony trioxide | 5 | 5 | 5 | 7 | 7 | 5 |
| Tensile strength (kgf/cm$^2$) | 360 | 350 | 350 | 320 | 310 | 310 |
| Bending elastic modulus (kgf/cm$^2$) | 24,000 | 27,000 | 29,000 | 31,000 | 33,000 | 31,000 |
| Izod impact strength (kgf · cm/cm$^2$) | 5.0 | 4.5 | 4.2 | 3.8 | 3.5 | 3.8 |
| Arc resistance (sec) | 110 | 105 | 100 | 80 | 70 | 75 |
| Bleeding property of final product (100° C., 240 hr) | Good | Good | Good | Good | Good | Good |
| Bleeding property onto mold (after 100 shots of injection molding) | Good | Good | Good | Good | Good | Good |
| Appearance of final product (after 100 shots of injection molding) | Good | Good | Good | Good | Good | Good |
| Flammability (UL94 vertical method, 1.6 mm, class) | V-2 | V-2 | V-2 | V-1 | V-0 | V-2 |
| Example | 7 | 8 | 9 | 10 | 11 | 12 |
| Blend (% by weight) | | | | | | |
| PP homopolymer | 0 | 0 | 0 | 0 | 0 | 0 |
| PP block copolymer | 80 | 75 | 70 | 63 | 53 | 65 |
| Talc | 5 | 10 | 15 | 15 | 15 | 20 |
| Decabromodiphenylethane | 10 | 10 | 10 | 15 | 25 | 10 |
| Antimony trioxide | 5 | 5 | 5 | 7 | 7 | 5 |
| Tensile strength (kgf/cm$^2$) | 270 | 260 | 250 | 240 | 230 | 240 |
| Bending elastic modulus (kgf/cm$^2$) | 20,000 | 24,000 | 27,000 | 30,000 | 31,000 | 30,000 |
| Izod impact strength (kgf · cm/cm$^2$) | 5.5 | 4.9 | 4.5 | 4.4 | 4.0 | 4.5 |
| Arc resistance (sec) | 115 | 105 | 100 | 80 | 70 | 75 |
| Bleeding property of final product (100° C., 240 hr) | Good | Good | Good | Good | Good | Good |
| Bleeding property onto mold (after 100 shots of injection molding) | Good | Good | Good | Good | Good | Good |
| Appearance of final product (after 100 shots of injection molding) | Good | Good | Good | Good | Good | Good |
| Flammability (UL94 vertical method, 1.6 mm, class) | V-2 | V-2 | V-2 | V-1 | V-0 | V-2 |

TABLE 3

| Comparative Example | 13 | 14 | 15 | 16 | 17 | 18 |
|---|---|---|---|---|---|---|
| Blend (% by weight) | | | | | | |
| PP homopolymer | 80 | 75 | 70 | 63 | 53 | 65 |
| PP block copolymer | 0 | 0 | 0 | 0 | 0 | 0 |
| Talc | 5 | 10 | 15 | 15 | 15 | 20 |
| Decabromodiphenylether | 10 | 10 | 10 | 15 | 25 | 10 |
| Antimony trioxide | 5 | 5 | 5 | 7 | 7 | 5 |
| Tensile strength (kgf/cm$^2$) | 360 | 350 | 350 | 320 | 330 | 320 |
| Bending elastic modulus (kgf/cm$^2$) | 24,000 | 27,000 | 30,000 | 33,000 | 35,000 | 33,000 |
| Izod impact strength (kgf · cm/cm$^2$) | 4.5 | 4.0 | 3.8 | 3.5 | 3.0 | 3.3 |
| Arc resistance (sec) | 110 | 105 | 100 | 80 | 70 | 75 |
| Bleeding property of final product (100° C., | Poor | Poor | Poor | Poor | Poor | Good |

TABLE 3-continued

| | | | | | | |
|---|---|---|---|---|---|---|
| 240 hr) | | | | | | |
| Bleeding property onto mold (after 100 shots of injection molding) | Poor | Poor | Poor | Poor | Poor | Poor |
| Appearance of final product (after 100 shots of injection molding) | Poor | Poor | Poor | Poor | Poor | Poor |
| Flammability (UL94 vertical method, 1.6 mm, class) | V-2 | V-2 | V-2 | V-1 | V-0 | V-2 |

| Comparative Example | 19 | 20 | 21 | 22 | 23 | 24 |
|---|---|---|---|---|---|---|
| Blend (% by weight) | | | | | | |
| PP homopolymer | 0 | 0 | 0 | 0 | 0 | 0 |
| PP block copolymer | 80 | 75 | 70 | 63 | 53 | 65 |
| Talc | 5 | 10 | 15 | 15 | 15 | 20 |
| Decabromodiphenylether | 10 | 10 | 10 | 15 | 25 | 10 |
| Antimony trioxide | 5 | 5 | 5 | 7 | 7 | 5 |
| Tensile strength (kgf/cm$^2$) | 280 | 270 | 260 | 250 | 240 | 250 |
| Bending elastic modulus (kgf/cm$^2$) | 20,000 | 24,000 | 27,000 | 30,000 | 31,000 | 30,000 |
| Izod impact strength (kgf · cm/cm$^2$) | 4.9 | 4.5 | 4.1 | 4.0 | 3.5 | 4.0 |
| Arc resistance (sec) | 105 | 105 | 100 | 75 | 70 | 75 |
| Bleeding property of final product (100° C., 240 hr) | Good | Good | Good | Good | Good | Good |
| Bleeding property onto mold (after 100 shots of injection molding) | Poor | Poor | Poor | Poor | Poor | Poor |
| Appearance of final product (after 100 shots of injection molding) | Poor | Poor | Poor | Poor | Poor | Poor |
| Flammability (UL94 vertical method, 1.6 mm, class) | V-2 | V-2 | V-2 | V-1 | V-0 | V-2 |

INDUSTRIAL APPLICABILITY

Since the crystalline polyolefin resin compositions of the present invention comprise a crystalline propylene polymer, inorganic filler, specific halogen-containing flame retardant, and flame retarding auxiliary each blended therein, blooming (separation in a powder-like form) onto the surface of mold at the time of injection molding can be prevented, inferiority in appearance of final products due to transferring of bleeded ingredient onto the mold is removed, and decrease in productivity due to wiping up of bleeded ingredient can be avoided.

Further, since the crystalline polyolefin resin compositions of the present invention can be satisfied not only with bleeding property onto the mold, but also with mechanical properties (tensile strength and bending elastic modulus), impact resistance, electrical property, bleeding property of final product, appearance of final product, and flame retardancy at the same time, the compositions can widely be used for electrical insulating parts such as plug covers, switchboard covers, connector covers, code reel cases, noise filter bobbins, parts of copiers, parts of refrigerators, and parts of tuners including deflection yoke separators.

We claim:

1. A crystalline polyolefin resin composition comprising 40 to 85% by weight of a crystalline propylene homopolymer having a melt flow rate of 1.0 to 80 g/10 min or a crystalline propylene-ethylene block copolymer having an ethylene content of 2 to 35% by weight and a melt flow rate of 1.0 to 40 g/10 min, 3 to 40% by weight of an inorganic filler, 7 to 30% by weight of decabromodiphenylethane as flame retardant, and 3 to 15% by weight of a flame retarding auxiliary.

2. The crystalline polyolefin resin composition according to claim 1, wherein said inorganic filler is a talc, mica, silica, calcium carbonate, barium sulfate, or glass fiber.

3. The crystalline polyolefin resin composition according to claim 1 wherein said flame retarding auxiliary is an antimony compound or boron compound.

4. The crystalline polyolefin resin composition according to claim 2 wherein said flame retarding auxiliary is an antimony compound or boron compound.

5. An electrical insulating part obtained by molding said crystalline polyolefin resin composition defined in any one of claims 1 to 3.

6. A crystalline polyolefin resin composition comprising 40 to 85% by weight of a crystalline propylene homopolymer having a melt flow rate of 1.0 to 80 g/10 min or a crystalline propylene-ethylene block copolymer having an ethylene content of 2 to 35% by weight and a melt flow rate of 1.0 to 40 g/10 min, 3 to 40% by weight of an inorganic filler, 7 to 30% by weight of a mixture of decabromodiphenylethane and ethylenebistetrabromophthalimide as flame retardant, and 3 to 15% by weight of a flame retarding auxiliary.

* * * * *